(12) United States Patent
Zhang et al.

(10) Patent No.: US 10,264,504 B2
(45) Date of Patent: Apr. 16, 2019

(54) METHOD AND DEVICE FOR USER EQUIPMENT SCHEDULING

(71) Applicant: Huawei Technologies Co., Ltd., Shenzhen (CN)

(72) Inventors: Liwen Zhang, Shanghai (CN); Zhiqiang Ju, Shanghai (CN); Lin Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 308 days.

(21) Appl. No.: 15/363,444

(22) Filed: Nov. 29, 2016

(65) Prior Publication Data

US 2017/0078941 A1    Mar. 16, 2017

Related U.S. Application Data

(63) Continuation of application No. PCT/CN2014/078827, filed on May 29, 2014.

(51) Int. Cl.
*H04W 36/30* (2009.01)
*H04W 76/27* (2018.01)
(Continued)

(52) U.S. Cl.
CPC ......... *H04W 36/30* (2013.01); *H04W 36/04* (2013.01); *H04W 36/32* (2013.01); *H04W 72/1231* (2013.01); *H04W 76/27* (2018.02)

(58) Field of Classification Search
CPC .. H04B 7/0413; H04B 17/318; H04B 7/0408; H04B 7/0456; H04B 7/0626; H04B 7/0695; H04B 7/088; H04B 17/336; H04B 17/345; H04B 17/391; H04B 17/3913; H04B 1/0028; H04B 1/713; H04B 1/715; H04B 1/7156; H04B 2201/692;
(Continued)

(56) References Cited

U.S. PATENT DOCUMENTS

2004/0085909 A1    5/2004  Soliman
2011/0310865 A1   12/2011  Kennedy et al.
(Continued)

FOREIGN PATENT DOCUMENTS

CN    102665285 A    9/2012
CN    102957997 A    3/2013
(Continued)

*Primary Examiner* — Natasha W Cosme
(74) *Attorney, Agent, or Firm* — Slater Matsil, LLP

(57) ABSTRACT

Embodiments of the present invention provide a user equipment scheduling method and device, where the method includes: predicting, according to radio resource information stored in an information sub-grid of an information grid, channel status information of first user equipment when the first user equipment is located in a geographical area in which any geographical sub-grid of a geographical grid is located, where there is a correspondence between an information sub-grid of the information grid and a geographical sub-grid of the geographical grid, and the information sub-grid is used to store radio resource information of a geographical area in which the corresponding geographical sub-grid is located; and scheduling the first user equipment according to the channel status information of the first user equipment.

20 Claims, 5 Drawing Sheets

Predict, according to radio resource information stored in an information sub-grid of an information grid, channel status information of first user equipment when the first user equipment is located in a geographical area in which any geographical sub-grid of a geographical grid is located ⎯⎯ 101

Schedule the first user equipment according to the channel status information of the first user equipment ⎯⎯ 102

(51) Int. Cl.
*H04W 36/04* (2009.01)
*H04W 36/32* (2009.01)
*H04W 72/12* (2009.01)

(58) Field of Classification Search
CPC .......... H04B 2201/71323; H04B 7/024; H04B 7/026; H04B 7/0452; H04W 24/02; H04W 24/08; H04W 72/042; H04W 72/0446; H04W 88/06; H04W 72/048; H04W 84/12; H04W 88/02; H04W 72/082; H04W 28/26; H04W 16/14; H04W 24/10; H04W 48/16; H04W 48/18; H04W 4/029; H04W 52/146; H04W 72/0453; H04W 72/085; H04W 76/27; H04W 88/08
USPC ........................................................ 370/332
See application file for complete search history.

(56) References Cited

U.S. PATENT DOCUMENTS

| | | | | |
|---|---|---|---|---|
| 2012/0064902 | A1* | 3/2012 | Kronander | H04W 16/14 455/450 |
| 2013/0122906 | A1 | 5/2013 | Klatt | |
| 2015/0155978 | A1* | 6/2015 | Eriksson | H04L 1/0026 370/329 |

FOREIGN PATENT DOCUMENTS

| | | |
|---|---|---|
| CN | 103081525 A | 5/2013 |
| CN | 103428861 A | 12/2013 |
| JP | 2011166583 A | 8/2011 |
| JP | 2013532930 A | 8/2013 |
| JP | 2015503863 A | 2/2015 |
| WO | 2013107386 A1 | 7/2013 |
| WO | 2014041406 A1 | 3/2014 |

* cited by examiner (a) Independent deployment  (b) Joint deployment

METHOD AND DEVICE FOR USER EQUIPMENT SCHEDULING

CROSS-REFERENCE TO RELATED APPLICATIONS

This application is a continuation of International Application No. PCT/CN2014/078827, filed on May 29, 2014, the disclosure of which is hereby incorporated by reference in its entirety.

TECHNICAL FIELD

Embodiments of the present invention relate to communications technologies, and in particular, to a method and device for user equipment scheduling.

BACKGROUND

In a mobile communications system, a network side device schedules user equipment, so that the user equipment can perform communication better.

In the prior art, before the network side device schedules the user equipment, the network side device sends a measurement control message to the user equipment, where the measurement control message includes content that the user equipment needs to measure. The user equipment performs measurement according to the measurement control message, and a result of the measurement is sent to the network side device in a form of a measurement report. The network side device schedules the user equipment according to the measurement report sent by the user equipment.

Then, in the prior art, a manner in which the user equipment first sends the measurement report and then the network side device schedules the user equipment according to the measurement report causes a time hysteresis when the network side device schedules the user equipment.

SUMMARY

Embodiments of the present invention provide a user equipment scheduling method and device, which can avoid a time hysteresis when a network device schedules user equipment.

According to a first aspect, an embodiment of the present invention provides a user equipment scheduling method, including predicting, according to radio resource information stored in an information sub-grid of an information grid, channel status information of first user equipment when the first user equipment is located in a geographical area in which any geographical sub-grid of a geographical grid is located. There is a correspondence between an information sub-grid of the information grid and a geographical sub-grid of the geographical grid. The information sub-grid is used to store radio resource information of a geographical area in which the corresponding geographical sub-grid is located. The method also includes scheduling the first user equipment according to the channel status information of the first user equipment.

With reference to the first aspect, in a first possible implementation manner of the first aspect, before the predicting, according to radio resource information stored in an information sub-grid of an information grid, channel status information of first user equipment when the first user equipment is located in a geographical area in which any geographical sub-grid of a geographical grid is located, the method further includes generating, according to the geographical grid obtained by dividing a geographical area covered by a mobile communications network, the information grid corresponding to the geographical grid; and obtaining radio resource of a geographical area in which a geographical sub-grid of the geographical grid is located, and storing the radio resource information into an information sub-grid, of the information grid, corresponding to the geographical sub-grid of the geographical grid.

With reference to the first possible implementation manner of the first aspect, in a second possible implementation manner of the first aspect, the radio resource information includes: channel measurement information and/or mobile communications network information. Obtaining the radio resource information of a geographical area in which a geographical sub-grid of the geographical grid is located includes obtaining a channel measurement information reported by second user equipment in the geographical area in which the geographical sub-grid of the geographical grid is located; and/or obtaining the Mobile Communications network information of the geographical area in which the geographical sub-grid of the geographical grid is located.

With reference to the second possible implementation manner of the first aspect, in a third possible implementation manner of the first aspect, the channel measurement information includes at least one of the following: a channel quality indicator, first drive test information, or second drive test information. The obtaining the channel measurement information reported by second user equipment in the geographical area in which the geographical sub-grid of the geographical grid is located includes at least one of the following implementation manners: obtaining measurement report information reported by user equipment in a radio resource control protocol connected state and in the geographical area in which the geographical sub-grid of the geographical grid is located; obtaining first drive test information reported by user equipment in an immediate minimization of drive tests state and in the geographical area in which the geographical sub-grid of the geographical grid is located; and obtaining second drive test information reported by user equipment in a logged minimization of drive tests state and in the geographical area in which the geographical sub-grid of the geographical grid is located.

With reference to the second or the third possible implementation manner of the first aspect, in a fourth possible implementation manner of the first aspect, the mobile communications network information includes network configuration information and/or network load information; and the obtaining the mobile communications network information of the geographical area in which the geographical sub-grid of the geographical grid is located includes: obtaining the network configuration information of the geographical area in which the geographical sub-grid of the geographical grid is located; and/or obtaining, according to a network load algorithm, the network load information of the geographical area in which the geographical sub-grid of the geographical grid is located.

With reference to any one of the first aspect or the first to the fourth possible implementation manners of the first aspect, in a fifth possible implementation manner of the first aspect, the predicting, according to radio resource information stored in an information sub-grid of an information grid, channel status information of first user equipment when the first user equipment is located in a geographical area in which any geographical sub-grid of a geographical grid is located includes determining a current geographical location of the first user equipment, and determining a first geographical sub-grid in which the current geographical location is located; determining, according to a moving trend of the first user equipment, a second geographical sub-grid that the first user equipment is about to enter; and predicting, according to the radio resource information stored in an information sub-grid corresponding to the second geographical sub-grid, channel status information of the first user equipment when the first user equipment is located in a geographical area in which the second geographical sub-grid is located.

With reference to the fifth possible implementation manner of the first aspect, in a sixth possible implementation manner of the first aspect, the scheduling the first user equipment according to the channel status information of the first user equipment includes, when the geographical area is covered by a homogeneous mobile communications network, and the first user equipment is in a radio resource control connected state, determining, according to the predicted channel status information of the first user equipment when the first user equipment is located in the geographical area in which the second geographical sub-grid is located, whether to heighten a scheduling priority of the first user equipment.

With reference to the fifth possible implementation manner of the first aspect, in a seventh possible implementation manner of the first aspect, the scheduling the first user equipment according to the channel status information of the first user equipment includes, when the geographical area is covered by a heterogeneous communications network, and the first user equipment is in a radio resource control connected state, determining, according to the predicted channel status information of the first user equipment when the first user equipment is located in the geographical area in which the second geographical sub-grid is located, whether to perform a handover for the first user equipment, where the handover is specifically a network handover, a base station handover, or a cell handover.

With reference to the fifth possible implementation manner of the first aspect, in an eighth possible implementation manner of the first aspect, the scheduling the first user equipment according to the channel status information of the first user equipment includes determining, according to the channel status information of the first user equipment, a communication service type of the first user equipment, and a fact that the geographical area in which the second geographical sub-grid is located is covered by a wireless local area network, whether to use the wireless local area network to offload service data transmitted by the first user equipment by using the mobile communications network.

With reference to any one of the first aspect or the second to the fourth possible implementation manners of the first aspect, in a ninth possible implementation manner of the first aspect, the scheduling the first user equipment according to the channel status information of the first user equipment includes, when the first user equipment is located in any geographical sub-grid, the any geographical sub-grid is covered by a heterogeneous mobile communications network, and the first user equipment switches from a radio resource control idle state to a radio resource control connected state, determining, according to the channel status information of the first user equipment, access probabilities of accessing mobile communications networks in the heterogeneous mobile communications network by the first user equipment; and determining, according to the access probabilities, a mobile communications network accessed by the first user equipment.

According to a second aspect, an embodiment of the present invention provides a network device. A prediction module is configured to protect, according to radio resource information stored in an information sub-grid of an information grid, channel status information of first user equipment when the first user equipment is located in a geographical area in which any geographical sub-grid of a geographical grid is located. There is a correspondence between an information sub-grid of the information grid and a geographical sub-grid of the geographical grid. The information sub-grid is used to store radio resource information of a geographical area in which the corresponding geographical sub-grid is located. A scheduling module is configured to schedule the first user equipment according to the channel status information of the first user equipment.

With reference to the second aspect, in a first possible implementation manner of the second aspect, the network device further includes a generation module, configured to: before the prediction module predicts, according to the radio resource information stored in the information sub-grid of the information grid, the channel status information of the first user equipment when the first user equipment is located in a geographical area in which any geographical sub-grid of the geographical grid is located, generate, according to the geographical grid obtained by dividing a geographical area covered by a mobile communications network, the information grid corresponding to the geographical grid. The obtaining module is configured to obtain radio resource information of a geographical area in which a geographical sub-grid of the geographical grid is located, and store the radio resource information into an information sub-grid, of the information grid, corresponding to the geographical sub-grid of the geographical grid.

With reference to the first possible implementation manner of the second aspect, in a second possible implementation manner of the second aspect, the radio resource information includes: channel measurement information and/or mobile communications network information. The obtaining module is specifically configured to obtain the channel measurement information reported by second user equipment in the geographical area in which the geographical sub-grid of the geographical grid is located; and/or to obtain the mobile communications network information of the geographical area in which the geographical sub-grid of the geographical grid is located.

With reference to the second possible implementation manner of the second aspect, in a third possible implementation manner of the second aspect, the channel measurement information includes at least one of the following: a channel quality indicator, first drive test information, or second drive test information. The obtaining module is further specifically configured to implement at least one of the following implementation manners: obtaining measurement report information reported by user equipment in a radio resource control protocol connected state and in the geographical area in which the geographical sub-grid of the geographical grid is located obtaining first drive test information reported by user equipment in an immediate minimization of drive tests state and in the geographical area in which the geographical sub-grid of the geographical grid is located; and obtaining second drive test information reported by user equipment in a logged minimization of drive tests state and in the geographical area in which the geographical sub-grid of the geographical grid is located.

With reference to the second or the third possible implementation manner of the second aspect, in a fourth possible implementation manner of the second aspect, the mobile communications network information includes network configuration information and/or network load information. The obtaining module is further specifically configured to obtain the network configuration information of the geographical area in which the geographical sub-grid of the geographical grid is located; and/or to obtain, according to a network load algorithm, the network load information of the geographical area in which the geographical sub-grid of the geographical grid is located.

With reference to any one of the second aspect or the first to the fourth possible implementation manners of the second aspect, in a fifth possible implementation manner of the second aspect, the prediction module is specifically configured to determine a current geographical location of the first user equipment, and determine a first geographical sub-grid in which the current geographical location is located, to determine, according to a moving trend of the first user equipment, a second geographical sub-grid that the first user equipment is about to enter, and to predict, according to the radio resource information stored in an information sub-grid corresponding to the second geographical sub-grid, channel status information of the first user equipment when the first user equipment is located in a geographical area in which the second geographical sub-grid is located.

With reference to the fifth possible implementation manner of the second aspect, in a sixth possible implementation manner of the second aspect, the scheduling module is specifically configured to, when the geographical area is covered by a homogeneous mobile communications network, and the first user equipment is in a radio resource control connected state, determine, according to the predicted channel status information of the first user equipment when the first user equipment is located in the geographical area in which the second geographical sub-grid is located, whether to heighten a scheduling priority of the first user equipment.

With reference to the fifth possible implementation manner of the second aspect, in a seventh possible implementation manner of the second aspect, the scheduling module is specifically configured to, when the geographical area is covered by a heterogeneous communications network, and the first user equipment is in a radio resource control connected state, determine, according to the predicted channel status information of the first user equipment when the first user equipment is located in the geographical area in which the second geographical sub-grid is located, whether to perform a handover for the first user equipment. The handover is specifically a network handover, a base station handover, or a cell handover.

With reference to the fifth possible implementation manner of the second aspect, in an eighth possible implementation manner of the second aspect, the scheduling module is specifically configured to determine, according to the channel status information of the first user equipment, a communication service type of the first user equipment, and a fact that the geographical area in which the second geographical sub-grid is located is covered by a wireless local area network, whether to use the wireless local area network to offload service data transmitted by the first user equipment by using the mobile communications network.

With reference to any one of the second aspect or the first to the fourth possible implementation manners of the second aspect, in a ninth possible implementation manner of the second aspect, the scheduling module is specifically configured to: when the first user equipment is located in any geographical sub-grid, the any geographical sub-grid is covered by a heterogeneous mobile communications network, and the first user equipment switches from a radio resource control idle state to a radio resource control connected state, determine, according to the channel status information of the first user equipment, access probabilities of accessing mobile communications networks in the heterogeneous mobile communications network by the first user equipment; and determine, according to the access probabilities, a mobile communications network accessed by the first user equipment.

According to a third aspect, an embodiment of the present invention provides a network device. A processor is configured to predict, according to radio resource information stored in an information sub-grid of an information grid, channel status information of first user equipment when the first user equipment is located in a geographical area in which any geographical sub-grid of a geographical grid is located. There is a correspondence between an information sub-grid of the information grid and a geographical sub-grid of the geographical grid, and the information sub-grid is used to store radio resource information of a geographical area in which the corresponding geographical sub-grid is located. The processor is further configured to schedule the first user equipment according to the channel status information of the first user equipment.

With reference to the third aspect, in a first possible implementation manner of the third aspect, the processor is further configured to: before the processor predicts, according to the radio resource information stored in the information sub-grid of the information grid, the channel status information of the first user equipment when the first user equipment is located in a geographical area in which any geographical sub-grid of the geographical grid is located, generate, according to the geographical grid obtained by dividing a geographical area covered by a mobile communications network, the information grid corresponding to the geographical grid. The network device further includes a receiver, which is configured to obtain radio resource information of a geographical area in which a geographical sub-grid of the geographical grid is located, and store the radio resource information into an information sub-grid, of the information grid, corresponding to the geographical sub-grid of the geographical grid.

With reference to the first possible implementation manner of the third aspect, in a second possible implementation manner of the third aspect, the radio resource information includes: channel measurement information and/or mobile communications network information. The receiver is specifically configured to obtain the channel measurement information reported by second user equipment in the geographical area in which the geographical sub-grid of the geographical grid is located, and/or to obtain the mobile communications network information of the geographical area in which the geographical sub-grid of the geographical grid is located.

With reference to the second possible implementation manner of the third aspect, in a third possible implementation manner of the third aspect, the channel measurement information includes at least one of the following: a channel quality indicator, first drive test information, or second drive test information. The receiver is further specifically configured to implement at least one of the following implementation manners: obtaining measurement report information reported by user equipment in a radio resource control protocol connected state and in the geographical area in which the geographical sub-grid of the geographical grid is located; obtaining first drive test information reported by user equipment in an immediate minimization of drive tests state and in the geographical area in which the geographical sub-grid of the geographical grid is located; and obtaining second drive test information reported by user equipment in a logged minimization of drive tests state and in the geographical area in which the geographical sub-grid of the geographical grid is located.

With reference to the second or the third possible implementation manner of the third aspect, in a fourth possible implementation manner of the third aspect, the mobile communications network information includes network configuration information and/or network load information. The receiver is specifically configured to obtain the network configuration information of the geographical area in which the geographical sub-grid of the geographical grid is located, and/or to obtain, according to a network load algorithm, the network load information of the geographical area in which the geographical sub-grid of the geographical grid is located.

With reference to any one of the third aspect or the first to the fourth possible implementation manners of the second aspect, in a fifth possible implementation manner of the third aspect, the processor is specifically configured to determine a current geographical location of the first user equipment, and determine a first geographical sub-grid in which the current geographical location is located, to determine, according to a moving trend of the first user equipment, a second geographical sub-grid that the first user equipment is about to enter, and to predict, according to the radio resource information stored in an information sub-grid corresponding to the second geographical sub-grid, channel status information of the first user equipment when the first user equipment is located in a geographical area in which the second geographical sub-grid is located.

With reference to the fifth possible implementation manner of the third aspect, in a sixth possible implementation manner of the third aspect, the processor is further specifically configured to, when the geographical area is covered by a homogeneous mobile communications network, and the first user equipment is in a radio resource control connected state, determine, according to the predicted channel status information of the first user equipment when the first user equipment is located in the geographical area in which the second geographical sub-grid is located, whether to heighten a scheduling priority of the first user equipment.

With reference to the fifth possible implementation manner of the third aspect, in a seventh possible implementation manner of the third aspect, the processor is further specifically configured to, when the geographical area is covered by a heterogeneous communications network, and the first user equipment is in a radio resource control connected state, determine, according to the predicted channel status information of the first user equipment when the first user equipment is located in the geographical area in which the second geographical sub-grid is located, whether to perform a handover for the first user equipment. The handover is specifically a network handover, a base station handover, or a cell handover.

With reference to the fifth possible implementation manner of the third aspect, in an eighth possible implementation manner of the third aspect, the processor is further specifically configured to determine, according to the channel status information of the first user equipment, a communication service type of the first user equipment, and a fact that the geographical area in which the second geographical sub-grid is located is covered by a wireless local area network, whether to use the wireless local area network to offload service data transmitted by the first user equipment by using the mobile communications network.

With reference to any one of the third aspect or the first to the fourth possible implementation manners of the third aspect, in a ninth possible implementation manner of the third aspect, the processor is further specifically configured to, when the first user equipment is located in any geographical sub-grid, the any geographical sub-grid is covered by a heterogeneous mobile communications network, and the first user equipment switches from a radio resource control idle state to a radio resource control connected state, determine, according to the channel status information of the first user equipment, access probabilities of accessing mobile communications networks in the heterogeneous mobile communications network by the first user equipment; and determine, according to the access probabilities, a mobile communications network to be accessed by the first user equipment.

The embodiments of the present invention provide the user equipment scheduling method and device, where in the method, channel status information of first user equipment when the first user equipment is located in a geographical area in which a geographical sub-grid, of a geographical grid, corresponding to any information sub-grid is located is predicted according to radio resource information stored in an information sub-grid of an information grid, and the first user equipment is scheduled according to the channel status information of the first user equipment. Therefore, scheduling the first user equipment not only consumes no measurement overheads of the first user equipment, but also considers factors such as channel quality fluctuation caused by mobility of the first user equipment; the radio resource information in the information sub-grid is fully used, and a time advance is obtained compared with an original manner in which a user first reports measurement information and then is scheduled.

BRIEF DESCRIPTION OF THE DRAWINGS

To describe the technical solutions in the embodiments of the present invention, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
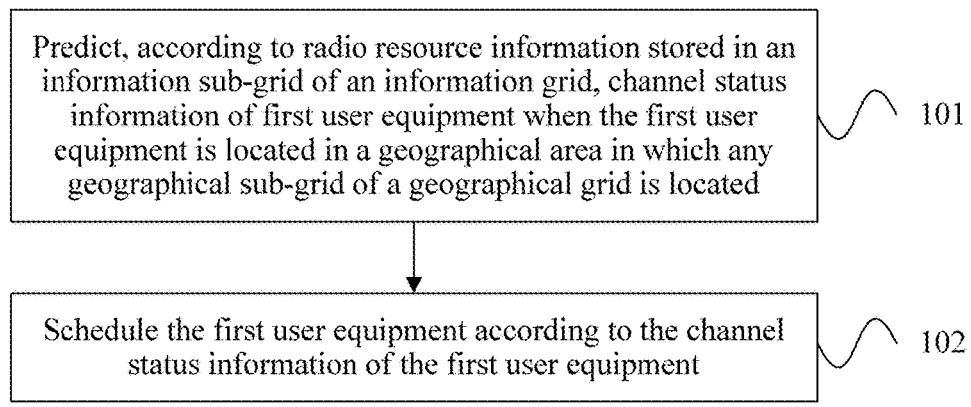
FIG. 1 is a schematic flowchart of a first embodiment of a user equipment scheduling method according to the present invention.

FIG. 1 is a schematic flowchart of a first embodiment of a user equipment scheduling method according to the present invention. This embodiment of the present invention is executed by a network device, where the network device may specifically be a base station, or may be a radio network controller. For example, for a universal terrestrial radio access network (UTRAN) system, the network device is a radio network controller (RNC); for an evolved UTRAN (E-UTRAN) system, the network device is an evolved Node B (eNB). The network device may be implemented by any software and/or hardware. As shown in FIG. 1, the user equipment scheduling method provided by this embodiment includes the following steps.

Step 101: Predict, according to radio resource information stored in an information sub-grid of an information grid, channel status information of first user equipment when the first user equipment is located in a geographical area in which any geographical sub-grid of a geographical grid is located. There is a correspondence between an information sub-grid of the information grid and a geographical sub-grid of the geographical grid, and the information sub-grid is used to store radio resource information of a geographical area in which the corresponding geographical sub-grid is located.

Step 102: Schedule the first user equipment according to the channel status information of the first user equipment.

In a specific implementation process, this embodiment of the present invention may be applied to a homogeneous wireless network, or may be applied to a heterogeneous wireless network. In a wireless network, corresponding radio resources are complex and diverse, including a time domain, a frequency domain, power, and the like. To optimize radio resource allocation and properly allocate the radio resources, the information grid begins to be applied to a cognitive wireless network. Based on a grid technology, the information grid involved in this embodiment stores radio resource information distributed in different geographical areas. Specifically, a geographical grid may be obtained by dividing a geographical area covered by a mobile communications network, and an information grid is generated on a basis of the geographical grid.

The geographical grid is divided into multiple geographical sub-grids. Correspondingly, the information grid is divided into multiple information sub-grids. Each geographical sub-grid is corresponding to one information sub-grid, and radio resource information generated in a geographical area in which the geographical sub-grid is located is stored in the corresponding information sub-grid.

Persons skilled in the art may understand that in a specific implementation process, when the geographical grid is divided into 3*5 grids, the information grid is also divided into 3*5 grids. For ease of storage and identification, a geographical sub-grid in the first row and the first column of the geographical grid is corresponding to an information sub-grid in the first row and the first column of the information grid; a geographical sub-grid in the first row and the second column of the geographical grid is corresponding to an information sub-grid in the first row and the second column of the information grid; and so on.

In the cognitive wireless network, a cognitive pilot channel (CPC for short) is introduced. The CPC carries radio resource information of each information sub-grid in the information grid, where each information sub-grid includes geographical location information, operator information, frequency band information, radio access technology information, and the like. The radio resource information of the information sub-grid has the following functions. For example, when the first user equipment is turned on, the first user equipment reads corresponding radio resource information in an information sub-grid corresponding to a geographical area in which the first user equipment is located, and autonomously performs environment perception, network discovery, and autonomous network selection; or when the first user equipment is in a moving process and is moving from one geographical sub-grid to another geographical sub-grid, the network device predicts channel status information of the first user equipment according to radio resource information in an information sub-grid corresponding to the another geographical sub-grid, and schedules the first user equipment according to the channel status information of the first user equipment.

First, a specific embodiment is used to describe how to obtain the information grid and radio resource information in the sub-grid of the information grid. Specifically, according to the geographical grid obtained by dividing the geographical area covered by the mobile communications network, the network device generates the information grid corresponding to the geographical grid, obtains radio resource information of a geographical area in which a geographical sub-grid of the geographical grid is located, and stores the radio resource information into an information sub-grid, of the information grid, corresponding to the geographical sub-grid of the geographical grid. A specific embodiment is used as an example for detailed description in the following.

The geographical area covered by the mobile communications network is first determined, and geographical areas covered by multiple mobile communications networks (cellular networks or non-cellular networks) are divided. Specifically, a correlation distance of shadow fading in a macro cell environment of a common urban area is 50 m, and therefore, a 10 m*10 m granularity is used during division in this embodiment. The division in this embodiment is merely exemplary. This embodiment sets no special limitation herein on a specific division manner.

Persons skilled in the art may understand that, in a condition that small scale fading is ignored, radio channel environments are similar in areas covered by a same geographical sub-grid of the geographical grid. After the geographical grid is determined, the information grid is generated, where there is a correspondence between the geographical grid and the information grid, the information grid includes multiple information sub-grids, and radio resource information of an area in which a geographical sub-grid is located is correspondingly stored in an information sub-grid of the information grid.

Figure 2:
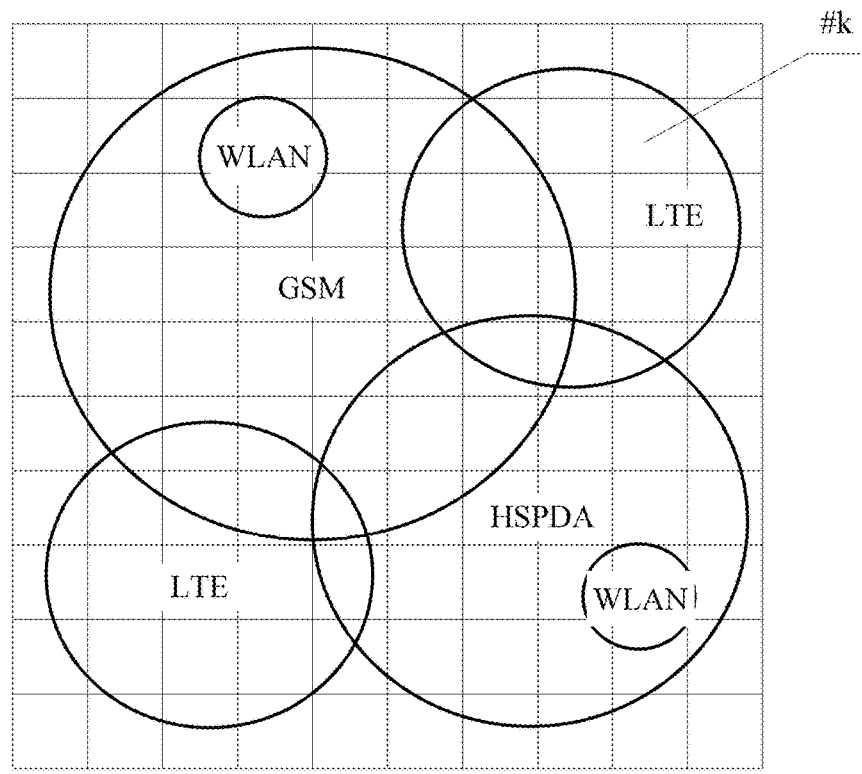
FIG. 2 is a schematic diagram of an information grid according to the present invention.

FIG. 2 is a schematic diagram of an information grid according to the present invention. As shown in FIG. 2, the information grid provided by this embodiment of the present invention includes 100 information sub-grids. A geographical sub-grid corresponding to the information grid is covered by multiple networks. For ease of description, in this embodiment, a network coverage condition is also drawn in the schematic diagram of the information grid. In this embodiment, multiple kinds of network coverage exist, which mainly include a Long Term Evolution (LTE for short) communications system, Global System for Mobile communications (GSM for short), High Speed Downlink Packet Access (HSPDA for short), a wireless local access network (WLAN for short), and the like.

The network device obtains radio resource information of an area in which each geographical sub-grid of the geographical grid is located, where the radio resource information mainly includes channel measurement information and/or mobile communications network information.

For the mobile communications network information, mobile communications network information of the area in which the geographical sub-grid of the geographical grid is located is obtained. The mobile communications network information includes network configuration information and/or network load information. An arbitrary information sub-grid "#k" is used as an example. For ease of description, "#k" represents a mark of one information sub-grid of the information grid, and is used to identify the information sub-grid. Persons skilled in the art may understand that, in a specific implementation process, the information sub-grid may be further identified in another manner.

This embodiment sets no special limitation herein. The network configuration information is various kinds of information pre-configured in the network device, and includes current geographical location information, operator information, frequency band information, network coverage information, and the like. The network device may directly obtain, according to a configuration of the network device, network configuration information of the geographical area in which the geographical sub-grid of the geographical grid is located. The network load information is network load information, of the area in which the geographical sub-grid of the geographical grid is located, obtained by the network device according to a network load algorithm, and includes network light load information, network middle load information, or network heavy load information. Optionally, if it is a heterogeneous wireless network, the network load information includes load information of each wireless network. Then, the network device stores the mobile communications network information into the corresponding information sub-grid #k.

For the channel measurement information, the channel measurement information includes at least one of the following: a channel quality indicator, first drive test information, or second drive test information. A specific obtaining manner is as follows:

Channel measurement information reported by second user equipment in the geographical area in which the geographical sub-grid of the geographical grid is located is obtained. The second user equipment may specifically be at least one of: user equipment in a radio resource control connected state, user equipment in an immediate (Immediate) minimization of drive tests state, and user equipment in a logged (Logged) minimization of drive tests state. A minimization of drive tests (MDT) function uses user equipment to automatically collect measurement information and report drive test information to the network device (referring to an RNC for a UTRAN system, and referring to an eNB for an E-UTRAN system) by using control plane signaling. The drive test information can reflect a network condition and has a direct measurement and evaluation function on a network performance indicator. In a specific implementation process, the network device sends measurement configuration information to user equipment in a minimization of drive tests state. When satisfying a measurement condition, the user equipment starts to perform measurement to obtain drive test information, and then reports the drive test information to the network device.

The logged minimization of drive tests indicates that the user equipment is in a radio resource control idle state, and the user equipment performs measurement and storage in the idle state according to the configuration information, and reports a measurement report to a network side when subsequently entering a connected state and satisfying a report condition. The immediate minimization of drive tests indicates that the user equipment is in a radio resource control connected state, and the UE performs measurement in the connected state, and reports a measurement report to the network device after measurement is completed.

Therefore, the obtaining the channel measurement information reported by the second user equipment of the area in which the geographical sub-grid of the geographical grid is located includes at least one of the following implementation manners:

In a possible implementation manner, measurement report information reported by user equipment in a radio resource control connected state and in the geographical area in which the geographical sub-grid of the geographical grid is located is obtained. Specifically, an arbitrary information sub-grid #k is used as an example. The user equipment in the radio resource control connected state reports a measurement report to the network device, where the measurement report includes a channel quality indicator (Channel Quality Indicator, CQI for short), signal quality of a neighboring cell, a received signal strength indicator, and the like, and the measurement report information is stored in the corresponding information sub-grid #k as the channel measurement information.

In another possible implementation manner, first drive test information reported by user equipment in an immediate minimization of drive tests state and in the geographical area in which the geographical sub-grid of the geographical grid is located is obtained. An arbitrary information sub-grid #k is used as an example. The user equipment in the Immediate minimization of drive tests state periodically reports the first drive test information to the network device. The first drive test information is stored in the corresponding information sub-grid #k as the channel measurement information. The reported first drive test information includes: reference signal received power (RSRP for short), a quantity of times of radio link failures (RLF for short), a quantity of backoff times of a physical random access channel (PRACH for short), and the like.

In still another possible implementation manner, second drive test information reported by user equipment in a logged minimization of drive tests state and in the geographical area in which the geographical sub-grid of the geographical grid is located is obtained. An arbitrary information sub-grid #k is used as an example. When the user equipment in the Logged minimization of drive tests state performs measurement in the radio resource control idle state to obtain the second drive test information, a delay exists. For RSRP, when the user equipment in the Logged minimization of drive tests state frequently feeds back that RSRP of the area in which the geographical sub-grid is located is relatively weak, it indicates that the geographical sub-grid is under weak coverage or in a coverage hole. User equipment that newly initiates a call needs to be prevented from gaining access in this grid; a scheduling priority needs to be heightened for a user in an RRC connected state so as to ensure a service rate.

Figure 10:
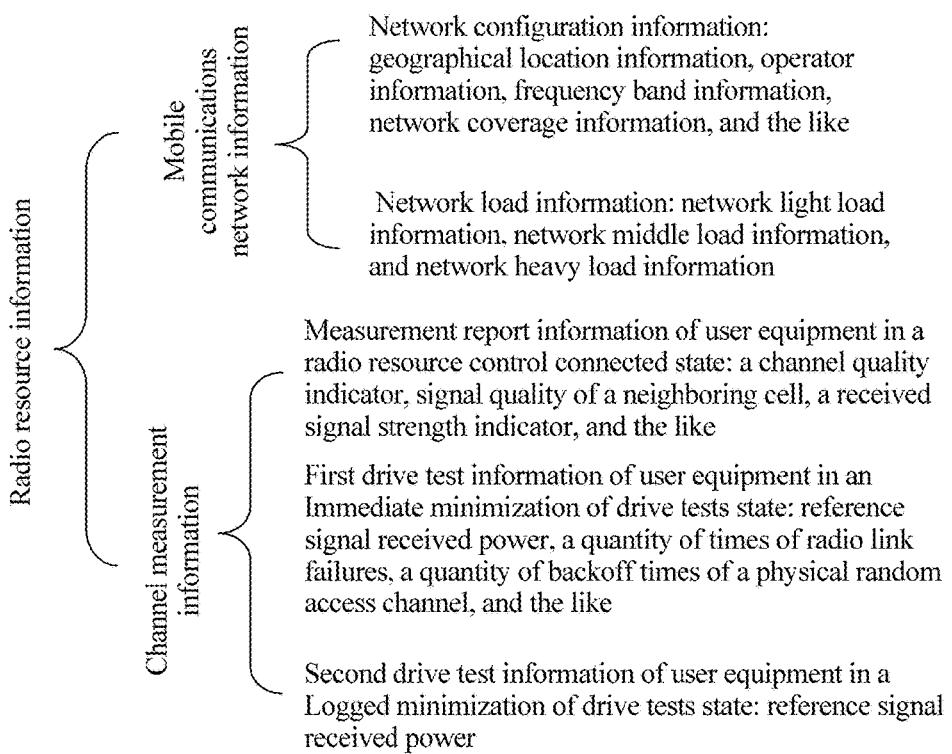
FIG. 10 provides a table with compositions of the radio resource information.

By performing the foregoing implementation manners, the information sub-grid stores the radio resource information. Compositions of the radio resource information are shown in the table of FIG. 10.

Further, persons skilled in the art may understand that the radio resource information stored in each information sub-grid may be classified into static information and dynamic information. The static information may specifically be the network configuration information, such as geographical location information, operator information, and frequency band information. The dynamic information may specifically be the network load information, the channel measurement information, and the like. The dynamic information may be periodically updated as time changes.

In conclusion, an information grid is generated by using a geographical grid, so as to ensure that radio resource information of user equipment has a spatial correlation; it is ensured, by means of periodical update, that the radio resource information of the user equipment has a temporal correlation; it is ensured, by means of two dimensions space and time, that user equipments in geographical sub-grids corresponding to information sub-grids have a correlation within a range of large scale fading.

The following uses a specific embodiment to describe how to schedule the first user equipment.

In step 101, the channel status information of the first user equipment when the first user equipment is located in a geographical area in which any geographical sub-grid of the geographical grid is located is predicted according to the radio resource information stored in the information sub-grid of the information grid.

In a specific implementation process, a current geographical location of the first user equipment is determined, and a first geographical sub-grid in which the current geographical location is located is determined; a second geographical sub-grid that the first user equipment is about to enter is determined according to a moving trend of the first user equipment; and channel status information of the first user equipment when the first user equipment is in the second geographical sub-grid is predicted according to radio resource information stored in an information sub-grid corresponding to the second geographical sub-grid. The channel status information may be channel quality, a channel condition that the first user equipment undergoes, a signal to noise ratio, a bit error rate, and the like.

Specifically, a Global Positioning System (GPS) may be used to locate and determine the geographical location of the first user equipment, or the geographical location of the first user equipment is determined by means of distance measurement on a basis of an angle of arrival (AOA for short) and the like. Then the first geographical sub-grid in which the current geographical location is located is determined, and the second geographical sub-grid that the first user equipment is about to enter is determined according to the moving trend of the first user equipment, where the moving trend includes a moving direction and a moving speed.

After it is determined that the first user equipment is about to enter the second geographical sub-grid, the radio resource information stored in the information sub-grid corresponding to the second geographical sub-grid is obtained. In this case, the channel status information of the first user equipment when the first user equipment is in the second geographical sub-grid is predicted according to the radio resource information stored in the information sub-grid corresponding to the second geographical sub-grid. Specifically, the radio resource information includes operator information, frequency band information, network load information, channel measurement information, and the like. Specifically, the radio resource information stored in the information sub-grid corresponding to the second geographical sub-grid is the radio resource information of the first user equipment when the first user equipment is located in the geographical area in which the second geographical sub-grid is located. The network device may determine in real time, according to the radio resource information stored in the information grid corresponding to the second geographical sub-grid, a current radio resource environment of the geographical area in which the second geographical sub-grid is located, where the current radio resource environment is a radio resource environment of the first user equipment when the first user equipment is located in the second geographical sub-grid.

Therefore, the network device can predict the channel status information of the first user equipment according to the radio resource information. For example, a CQI, RSRP, and the like stored in the information sub-grid corresponding to the second geographical sub-grid are a CQI and RSRP of the first user equipment when the first user equipment is located in the geographical area in which the second geographical sub-grid is located. The channel status information of the first user equipment can be predicted according to the CQI and the RSRP.

In step 102, the first user equipment is scheduled according to the channel status information of the first user equipment. Specifically, a scheduling priority of the first user equipment may be heightened, or handover processing is performed on the first user equipment, or offloading processing is performed on the first user equipment.

Persons skilled in the art may understand that scheduling processing in step 102 is in-advance scheduling. When the first user equipment is about to enter the second geographical sub-grid, the channel status information of the first user equipment is determined; when the first user equipment has entered the second geographical sub-grid, the first user equipment does not need to report a measurement report, and the first user equipment is directly scheduled according to the channel status information of the first user equipment.

In the user equipment scheduling method provided in this embodiment of the present invention, channel status information of first user equipment when the first user equipment is located in a geographical area in which a geographical sub-grid, of a geographical grid, corresponding to any information sub-grid is located is predicted according to radio resource information stored in an information sub-grid of an information grid, and the first user equipment is scheduled according to the channel status information of the first user equipment. Therefore, scheduling the first user equipment not only consumes no measurement overheads of the first user equipment, but also considers factors such as channel quality fluctuation caused by mobility of the first user equipment; the radio resource information in the information sub-grid is fully used, and a time advance is obtained compared with an original manner in which a user first reports measurement information and then is scheduled.

The following uses a specific embodiment to describe in detail scheduling the first user equipment by the network device in the present invention. Scheduling the first user equipment by the network device has two cases: One case is that the first user equipment is about to enter the second geographical sub-grid from the first geographical sub-grid, or the first user equipment just enters the second geographical sub-grid from the first geographical sub-grid; the other case is that the first user equipment is in the second geographical sub-grid and switches from a radio resource control idle state to a radio resource control connected state. The first case further includes the following scheduling scenarios:

In a homogeneous mobile communications network scenario, the scheduling priority of the first user equipment is heightened; in a heterogeneous mobile communications network scenario, a network handover is performed for the first user equipment; and in a case in which Wireless Fidelity (Wireless Fidelity, WiFi for short) coverage exists, service data transmitted by the first user equipment by using the mobile communications network is offloaded by using a wireless local area network. Persons skilled in the art may understand that embodiments are not independent of each other. Regardless of the homogeneous mobile communications network scenario or the heterogeneous mobile communications network scenario, whether to offload, by using the wireless local area network, the service data transmitted by the first user equipment by using the mobile communications network can be determined, provided that the WiFi coverage exists. The following uses specific embodiments to describe in detail possible implementation manners.

In a possible implementation manner, when the geographical area is covered by a homogeneous mobile communications network, and the first user equipment is in a radio resource control connected state, whether to heighten a scheduling priority of the first user equipment is determined according to the predicted channel status information of the first user equipment when the first user equipment is located in the geographical area in which the second geographical sub-grid is located.

Figure 3:
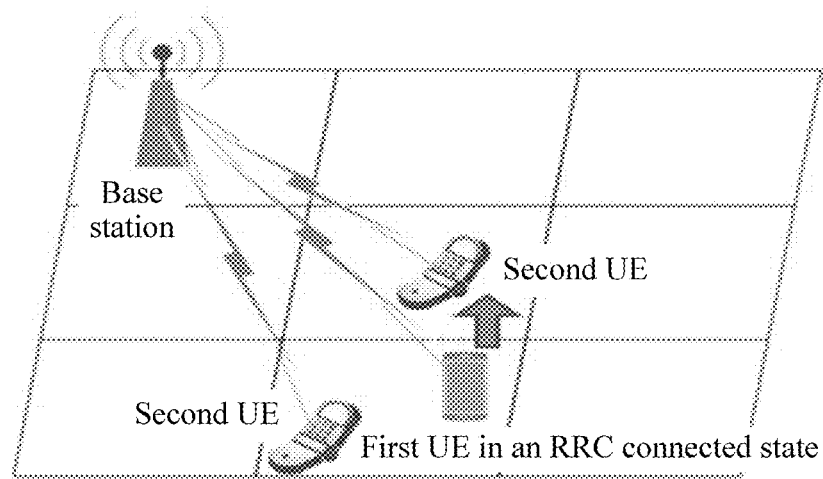
FIG. 3 is a schematic diagram of application scenario 1 of scheduling based on an information grid according to an embodiment of the present invention.

Specifically, reference may be made to FIG. 3. FIG. 3 is a schematic diagram of application scenario 1 of scheduling based on an information grid according to an embodiment of the present invention. As shown in FIG. 3, a geographical area is covered by a homogeneous mobile network, a same base station provides services for each user equipment, and the second User Equipment (User Equipment, UE for short) is used to report channel measurement information. When the first user equipment in the radio resource control (RRC) connected state is about to enter the second geographical sub-grid, channel quality of the first user equipment is determined according to a CQI (CQI stored in the information sub-grid corresponding to the second geographical sub-grid) and the like of the channel status information of the first user equipment when the first user equipment is located in the second geographical sub-grid, where the CQI is a measurement standard of communication quality of a radio channel.

The CQI can represent a channel measurement standard of a given channel, which is one value (or more values). Generally, a large-value CQI represents that a channel has high quality. When the channel quality is poor, the network device heightens the scheduling priority of the first user equipment; when the channel quality is good, the scheduling priority of the first user equipment does not need to be heightened. Specifically, a bandwidth resource that the network device allocates to user equipment is limited, and therefore, the network device allocates a resource to the user equipment in a descending order of scheduling priorities.

In another possible implementation manner, when the geographical area is covered by a heterogeneous communications network, and the first user equipment is in a radio resource control connected state, whether to perform a handover for the first user equipment is determined according to the channel status information of the first user equipment when the first user equipment is located in the second geographical sub-grid.

Figure 4:
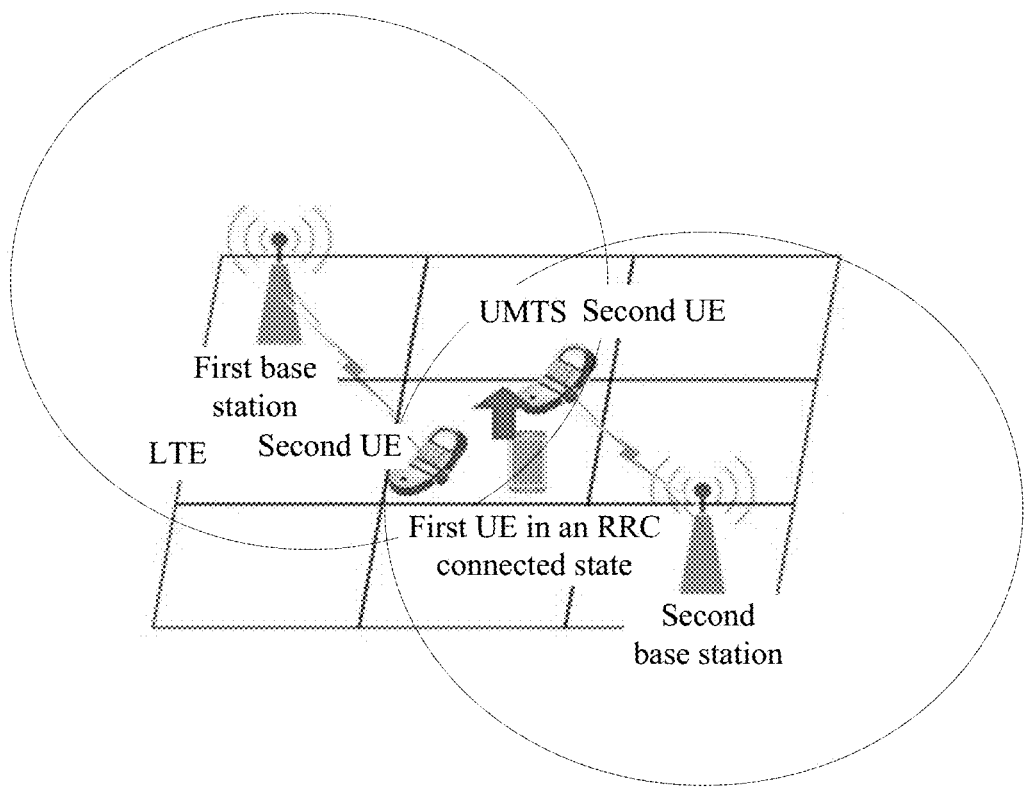
FIG. 4 is a schematic diagram of application scenario 2 of scheduling based on an information grid according to an embodiment of the present invention.

Specifically, reference may be made to FIG. 4. FIG. 4 is a schematic diagram of application scenario 2 of scheduling based on an information grid according to an embodiment of the present invention. As shown in FIG. 4, the geographical area is covered by an LTE network and a Universal Mobile Telecommunications System (UMTS for short) network. The LTE network is provided by a first base station, and the UMTS network is provided by a second base station. The second UE is used to report channel measurement information.

When the first UE in the RRC connected state follows an arrow direction and is about to move to the second geographical sub-grid, according to the predicted channel status information of the first UE when the first UE is located in the second geographical sub-grid, where the channel status information includes receiving quality, a receive level, and the like (stored in the information sub-grid corresponding to the second geographical sub-grid, or calculated according to other information stored in the information sub-grid corresponding to the second geographical sub-grid), the network device determines whether to perform a handover according to the channel status information, network load information, a user moving rate, and the like, where the handover is specifically a network handover, a base station handover, a cell handover, or the like.

The handover includes a handover based on a power budget, a handover based on the receive level, and a handover based on the receiving quality. Therefore, the channel status information may include receive power, the receive level, the receiving quality, and the like. The network handover refers to a handover between different networks in a heterogeneous network; the base station handover refers to a handover between base stations corresponding to different communications systems. The cell handover is a handover between cells corresponding to different communications systems.

In still another possible implementation manner, whether to use a wireless local area network to offload service data transmitted by the first user equipment by using the mobile communications network is determined according to the channel status information of the first user equipment, a communication service type of the first user equipment, and a fact that the geographical area in which the second geographical sub-grid is located is covered by the wireless local area network.

Specifically, the first user equipment is scheduled according to the channel status information of the first user equipment and the communication service type of the first user equipment. When it is determined, according to the channel status information of the first user equipment, that a serving cell of the first user equipment has extremely heavy load, and the first user equipment is performing a voice service, offloading is not considered, and the scheduling priority of the first user equipment is heightened so as to ensure a smooth user service rate.

When the first user equipment is performing a data service, if there is WIFI coverage in the geographical area in which the second geographical sub-grid is located, the service data transmitted by the first user equipment by using the mobile communications network is offloaded by using the wireless local area network.

Figure 5:
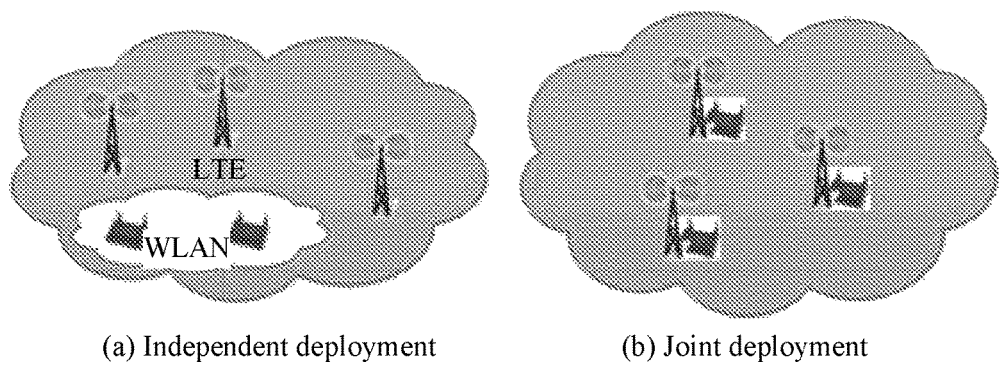
FIG. 5 is a schematic diagram of application scenario 3 of scheduling based on an information grid according to an embodiment of the present invention.

When offloading is performed by using WIFI, the following possible cases may be included. Details are shown in FIG. 5. FIG. 5 is a schematic diagram of application scenario 3 of scheduling based on an information grid according to an embodiment of the present invention. FIG. (a) is a scenario in which a WLAN and an LTE are independently deployed, and FIG. (b) is a scenario in which the WLAN and the LTE are jointly deployed. That the WLAN and the LTE are independently deployed indicates that the network device (base station of an LTE communications system) and a wireless local area network access point (WLAN AP for short) are independently disposed, and the two cannot communicate over a private interface. That the WLAN and the LTE are jointly deployed indicates that the WLAN AP is built in the network device (base station of the LTE communications system). That is, the two are disposed integrally, and the two can exchange information over a private interface.

In a scenario based on joint deployment, the network device and the WLAN AP can exchange information over the private interface. The WLAN AP reports load information to the network device, and the network device determines whether to instruct, by using a broadcast message or an RRC message, the first user equipment to turn on a WiFi switch.

In a scenario based on independent deployment, the network device and the WLAN AP cannot exchange information over the private interface. User equipment of which a WiFi switch is turned on reports load information to the network device, and the network device determines whether to instruct, by using a broadcast message or an RRC message, the first user equipment to turn on the WiFi switch.

Based on the foregoing embodiments, scheduling performed by the network device on the first user equipment when the first user equipment is about to enter the second geographical sub-grid from the first geographical sub-grid, or the first user equipment just enters the second geographical sub-grid from the first geographical sub-grid is described in detail. The following uses a specific embodiment to describe a condition of scheduling performed by the network device on the first user equipment when the first user equipment is located in the second geographical sub-grid.

The user equipment scheduling method provided by the present invention further includes, when the first user equipment is located in any geographical sub-grid, the any geographical sub-grid is covered by a heterogeneous mobile communications network, and the first user equipment switches from a radio resource control idle state to a radio resource control connected state, determining, according to the channel status information of the first user equipment, access probabilities of accessing mobile communications networks in the heterogeneous mobile communications network by the first user equipment; and determining, according to the access probabilities, a mobile communications network to be accessed by the first user equipment.

Figure 6:
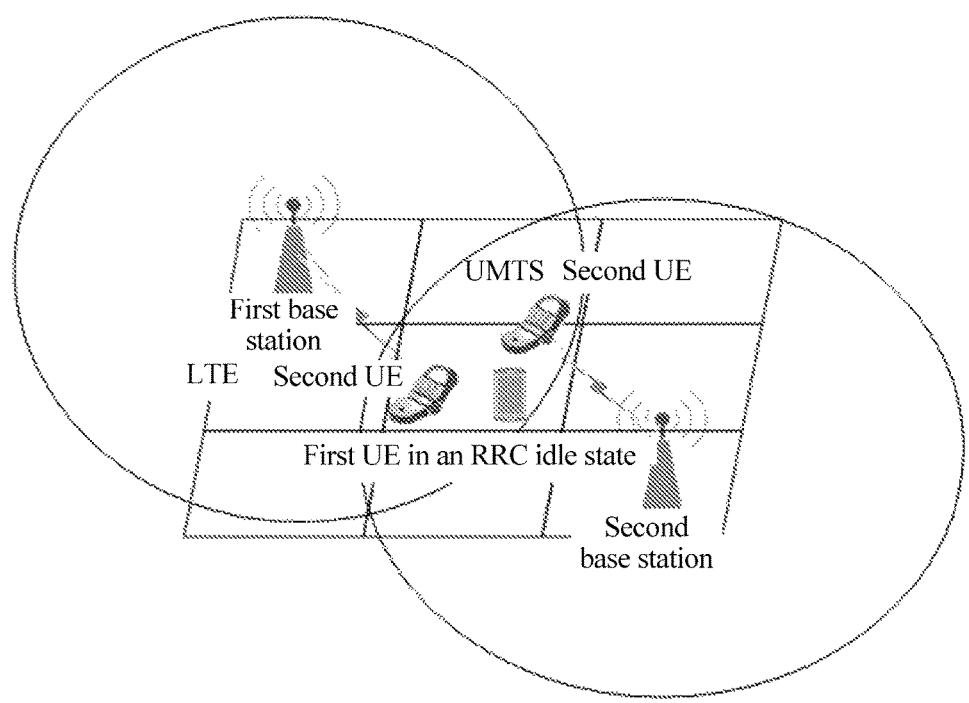
FIG. 6 is a schematic diagram of application scenario 4 of scheduling based on an information grid according to an embodiment of the present invention.

Specifically, FIG. 6 is a schematic diagram of application scenario 4 of scheduling based on an information grid according to an embodiment of the present invention. As shown in FIG. 6, a geographical area is covered by an LTE network and a UMTS network. The LTE network is provided by a first base station, and the UMTS network is provided by a second base station. The second UE is used to report channel measurement information. When the first UE in the RRC idle state is in any geographical sub-grid, the geographical sub-grid is covered by the LTE network and the UMTS network; when the first UE switches from the RRC idle state to the RRC connected state, and the first UE needs to access the network, a channel condition that the user equipment undergoes after accessing each mobile communications network is determined according to the channel status information of the first user equipment, where the channel status information includes network load and the like of each mobile communications network. A first access probability that the first user equipment accesses the LTE and a second access probability that the first user equipment accesses the UMTS are determined according to the channel status information. For example, when network load of the LTE network is light load, and network load of the UMTS network is heavy load, the first access probability is greater than the second access probability, and it is determined that the mobile communications network to be accessed by the first user equipment is the LTE.

In conclusion, in the user equipment scheduling method provided by this embodiment of the present invention, regardless of which of the foregoing communication scenarios first user equipment is located in, measurement overheads of the first user equipment are not required, and factors such as channel quality fluctuation caused by mobility of the first user equipment are considered; radio resource information in an sub-grid is fully used, and a time advance is obtained compared with an original manner in which a user first reports measurement information and then is scheduled.

Figure 7:
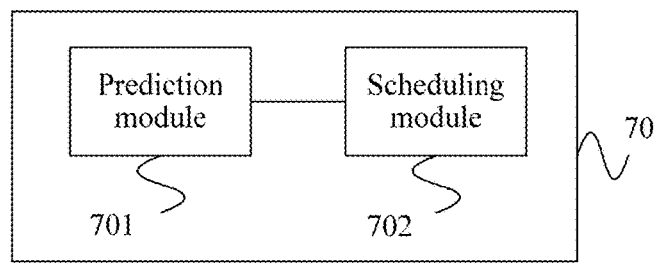
FIG. 7 is a schematic structural diagram of a first embodiment of a network device according to the present invention.

FIG. 7 is a schematic structural diagram of a first embodiment of a network device according to the present invention. A network device 70 provided by this embodiment includes: a prediction module 701 and a scheduling module 702.

The prediction module 701 is configured to predict, according to radio resource information stored in an information sub-grid of an information grid, channel status information of first user equipment when the first user equipment is located in a geographical area in which any geographical sub-grid of a geographical grid is located. There is a correspondence between an information sub-grid of the information grid and a geographical sub-grid of the geographical grid, and the information sub-grid is used to store radio resource information of a geographical area in which the corresponding geographical sub-grid is located. The scheduling module 702 is configured to schedule the first user equipment according to the channel status information of the first user equipment.

Figure 8:
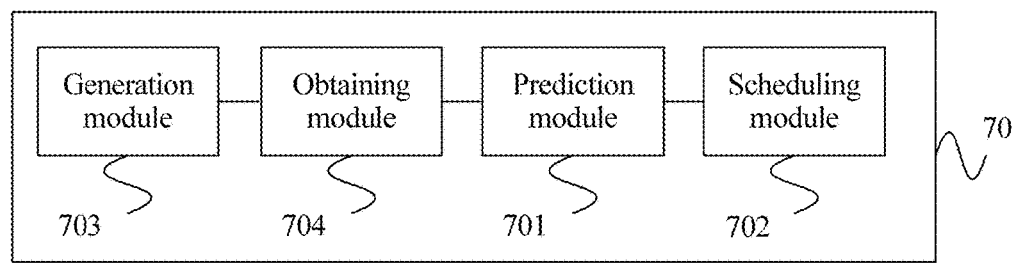
FIG. 8 is a schematic structural diagram of a second embodiment of a network device according to the present invention.

FIG. 8 is a schematic structural diagram of a second embodiment of a network device according to the present invention. This embodiment is implemented based on the embodiment in FIG. 7, will now be described.

Optionally, the network device further includes: a generation module 703, configured to: before the prediction module predicts, according to the radio resource information stored in the information sub-grid of the information grid, the channel status information of the first user equipment when the first user equipment is located in a geographical area in which any geographical sub-grid of the geographical grid is located, generate, according to the geographical grid obtained by dividing a geographical area covered by a mobile communications network, the information grid corresponding to the geographical grid. An obtaining module 704 is configured to obtain radio resource information of a geographical area in which a geographical sub-grid of the geographical grid is located, and store the radio resource information into an information sub-grid, of the information grid, corresponding to the geographical sub-grid of the geographical grid.

Optionally, the radio resource information includes: channel measurement information and/or mobile communications network information. The obtaining module 704 is specifically configured to obtain the channel measurement information reported by second user equipment in the geographical area in which the geographical sub-grid of the geographical grid is located; and/or to obtain the mobile communications network information of the geographical area in which the geographical sub-grid of the geographical grid is located.

Optionally, the channel measurement information includes at least one of the following: a channel quality indicator, first drive test information, or second drive test information. The obtaining module 704 is further specifically configured to implement at least one of the following implementation manners obtaining measurement report information reported by user equipment in a radio resource control protocol connected state and in the geographical area in which the geographical sub-grid of the geographical grid is located, obtaining first drive test information reported by user equipment in an immediate minimization of drive tests state and in the geographical area in which the geographical sub-grid of the geographical grid is located, and obtaining second drive test information reported by user equipment in a logged minimization of drive tests state and in the geographical area in which the geographical sub-grid of the geographical grid is located.

Optionally, the mobile communications network information includes network configuration information and/or network load information. The obtaining module 704 is further specifically configured to obtain the network configuration information of the geographical area in which the geographical sub-grid of the geographical grid is located, and/or ¶ Obtain, according to a network load algorithm, the network load information of the geographical area in which the geographical sub-grid of the geographical grid is located.

Optionally, the prediction module 701 is specifically configured to determine a current geographical location of the first user equipment, and determine a first geographical sub-grid in which the current geographical location is located, determine, according to a moving trend of the first user equipment, a second geographical sub-grid that the first user equipment is about to enter, and predict, according to the radio resource information stored in an information sub-grid corresponding to the second geographical sub-grid, channel status information of the first user equipment when the first user equipment is located in a geographical area in which the second geographical sub-grid is located.

Optionally, the scheduling module 702 is specifically configured to, when the geographical area is covered by a homogeneous mobile communications network, and the first user equipment is in a radio resource control connected state, determine, according to the predicted channel status information of the first user equipment when the first user equipment is located in the geographical area in which the second geographical sub-grid is located, whether to heighten a scheduling priority of the first user equipment.

Optionally, the scheduling module 702 is specifically configured to, when the geographical area is covered by a heterogeneous communications network, and the first user equipment is in a radio resource control connected state, determine, according to the predicted channel status information of the first user equipment when the first user equipment is located in the geographical area in which the second geographical sub-grid is located, whether to perform a handover for the first user equipment. The handover is specifically a network handover, a base station handover, or a cell handover.

Optionally, the scheduling module 702 is specifically configured to determine, according to the channel status information of the first user equipment, a communication service type of the first user equipment, and a fact that the geographical area in which the second geographical sub-grid is located is covered by a wireless local area network, whether to use the wireless local area network to offload service data transmitted by the first user equipment by using the mobile communications network.

Optionally, the scheduling module 702 is specifically configured to, when the first user equipment is located in any geographical sub-grid, the any geographical sub-grid is covered by a heterogeneous mobile communications network, and the first user equipment switches from a radio resource control idle state to a radio resource control connected state, determine, according to the channel status information of the first user equipment, access probabilities of accessing mobile communications networks in the heterogeneous mobile communications network by the first user equipment; and determine, according to the access probabilities, a mobile communications network accessed by the first user equipment.

The network device provided by this embodiment may be used to execute the technical solutions of the foregoing method embodiments, and implementation principles and technical effects of the network device are similar to those of the method embodiments. Details are not described herein in this embodiment.

Figure 9:
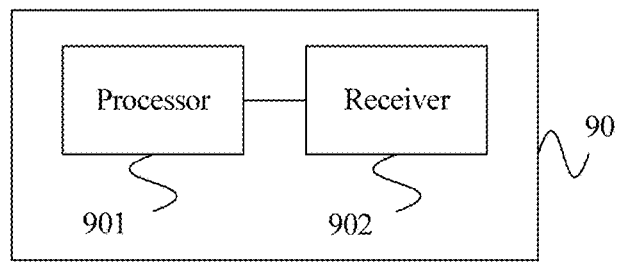
FIG. 9 is a schematic structural diagram of a third embodiment of a network device according to the present invention.

FIG. 9 is a schematic structural diagram of a third embodiment of a network device according to the present invention. The network device provided by this embodiment includes a processor 901 and a receiver 902.

The processor 901 is configured to predict, according to radio resource information stored in an information sub-grid of an information grid, channel status information of first user equipment when the first user equipment is located in a geographical area in which any geographical sub-grid of a geographical grid is located, where there is a correspondence between an information sub-grid of the information grid and a geographical sub-grid of the geographical grid, and the information sub-grid is used to store radio resource information of a geographical area in which the corresponding geographical sub-grid is located. The processor 901 is further configured to schedule the first user equipment according to the channel status information of the first user equipment.

Optionally, the processor 901 is further configured to: before the processor predicts, according to the radio resource information stored in the information sub-grid of the information grid, the channel status information of the first user equipment when the first user equipment is located in a geographical area in which any geographical sub-grid of the geographical grid is located, generate, according to the geographical grid obtained by dividing a geographical area covered by a mobile communications network, the information grid corresponding to the geographical grid. The receiver 902 is configured to obtain radio resource information of a geographical area in which a geographical sub-grid of the geographical grid is located, and store the radio resource information into an information sub-grid, of the information grid, corresponding to the geographical sub-grid of the geographical grid.

Optionally, the radio resource information includes channel measurement information and/or mobile communications network information. The receiver 902 is specifically configured to obtain the channel measurement information reported by second user equipment in the geographical area in which the geographical sub-grid of the geographical grid is located, and/or to obtain the mobile communications network information of the geographical area in which the geographical sub-grid of the geographical grid is located.

Optionally, the channel measurement information includes at least one of the following: a channel quality indicator, first drive test information, or second drive test information. The receiver 902 is further specifically configured to implement at least one of the following implementation manners: obtaining measurement report information reported by user equipment in a radio resource control protocol connected state and in the geographical area in which the geographical sub-grid of the geographical grid is located; obtaining first drive test information reported by user equipment in an immediate minimization of drive tests state and in the geographical area in which the geographical sub-grid of the geographical grid is located; and obtaining second drive test information reported by user equipment in a logged minimization of drive tests state and in the geographical area in which the geographical sub-grid of the geographical grid is located.

Optionally, the mobile communications network information includes network configuration information and/or network load information. The receiver 902 is further specifically configured to obtain the network configuration information of the geographical area in which the geographical sub-grid of the geographical grid is located, and/or to obtain, according to a network load algorithm, the network load information of the geographical area in which the geographical sub-grid of the geographical grid is located.

Optionally, the processor 901 is specifically configured to determine a current geographical location of the first user equipment, and determine a first geographical sub-grid in which the current geographical location is located, to determine, according to a moving trend of the first user equipment, a second geographical sub-grid that the first user equipment is about to enter, and to predict, according to the radio resource information stored in an information sub-grid corresponding to the second geographical sub-grid, channel status information of the first user equipment when the first user equipment is located in a geographical area in which the second geographical sub-grid is located.

Optionally, the processor 901 is further specifically configured to, when the geographical area is covered by a homogeneous mobile communications network, and the first user equipment is in a radio resource control connected state, determine, according to the predicted channel status information of the first user equipment when the first user equipment is located in the geographical area in which the second geographical sub-grid is located, whether to heighten a scheduling priority of the first user equipment.

Optionally, the processor 901 is further specifically configured to, when the geographical area is covered by a heterogeneous communications network, and the first user equipment is in a radio resource control connected state, determine, according to the predicted channel status information of the first user equipment when the first user equipment is located in the geographical area in which the second geographical sub-grid is located, whether to perform a handover for the first user equipment. The handover is specifically a network handover, a base station handover, or a cell handover.

Optionally, the processor 901 is further specifically configured to determine, according to the channel status information of the first user equipment, a communication service type of the first user equipment, and a fact that the geographical area in which the second geographical sub-grid is located is covered by a wireless local area network, whether to use the wireless local area network to offload service data transmitted by the first user equipment by using the mobile communications network.

Optionally, the processor 901 is further specifically configured to, when the first user equipment is located in any geographical sub-grid, the any geographical sub-grid is covered by a heterogeneous mobile communications network, and the first user equipment switches from a radio resource control idle state to a radio resource control connected state, determine, according to the channel status information of the first user equipment, access probabilities of accessing mobile communications networks in the heterogeneous mobile communications network by the first user equipment; and determine, according to the access probabilities, a mobile communications network to be accessed by the first user equipment.

The network device provided by this embodiment may be used to execute the technical solutions of the foregoing method embodiments, and implementation principles and technical effects of the network device are similar to those of the method embodiments. Details are not described herein in this embodiment.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A mobile device scheduling method, comprising:
   predicting, according to radio resource information stored in an information sub-grid of an information grid, channel status information of a first mobile device when the first mobile device is located in a geographical area in which any geographical sub-grid of a geographical grid is located, wherein there is a correspondence between an information sub-grid of the information grid and a geographical sub-grid of the geographical grid, and wherein the information sub-grid is used to store radio resource information of a geographical area in which the corresponding geographical sub-grid is located; and
   scheduling the first mobile device according to the channel status information of the first mobile device.

2. The method according to claim 1, wherein, before the predicting, the method further comprises:
   generating, according to the geographical grid obtained by dividing a geographical area covered by a mobile communications network, the information grid corresponding to the geographical grid;
   obtaining radio resource information of a geographical area in which a geographical sub-grid of the geographical grid is located; and
   storing the radio resource information into an information sub-grid, of the information grid, corresponding to the geographical sub-grid of the geographical grid.

3. The method according to claim 2, wherein the radio resource information comprises: channel measurement information and/or mobile communications network information; and
   wherein obtaining the radio resource information comprises obtaining a channel measurement information reported by second mobile device in the geographical area in which the geographical sub-grid of the geographical grid is located, and/or comprises obtaining a mobile communications network information of the geographical area in which the geographical sub-grid of the geographical grid is located.

4. The method according to claim 3, wherein the channel measurement information comprises at least one of a channel quality indicator, first drive test information, or second drive test information, and wherein obtaining the channel measurement information reported by second mobile device in the geographical area in which the geographical sub-grid of the geographical grid is located comprises at least one of the following:
   obtaining measurement report information reported by mobile device in a radio resource control connected state and in the geographical area in which the geographical sub-grid of the geographical grid is located;
   obtaining first drive test information reported by mobile device in an immediate minimization of drive tests state and in the geographical area in which the geographical sub-grid of the geographical grid is located; and
   obtaining second drive test information reported by mobile device in a logged minimization of drive tests state and in the geographical area in which the geographical sub-grid of the geographical grid is located.

5. The method according to claim 3, wherein the mobile communications network information comprises network configuration information and/or network load information; and
   wherein obtaining the mobile communications network information comprises obtaining a network configuration information of the geographical area in which the geographical sub-grid of the geographical grid is located, and/or comprises obtaining, according to a network load algorithm, a network load information of the geographical area in which the geographical sub-grid of the geographical grid is located.

6. The method according to claim 1, wherein predicting the channel status information of the first mobile device comprises:
   determining a current geographical location of the first mobile device;
   determining a first geographical sub-grid in which the current geographical location is located;
   determining, according to a moving trend of the first mobile device, a second geographical sub-grid that the first mobile device is about to enter; and
   predicting, according to a radio resource information stored in an information sub-grid corresponding to the second geographical sub-grid, channel status information of the first mobile device when the first mobile device is located in a geographical area in which the second geographical sub-grid is located.

7. The method according to claim 6, wherein the geographical area is covered by a homogeneous mobile communications network, and the first mobile device is in a radio resource control connected state; and
   wherein scheduling the first mobile device comprises determining, according to the predicted channel status information of the first mobile device when the first mobile device is located in the geographical area in which the second geographical sub-grid is located, whether to heighten a scheduling priority of the first mobile device.

8. The method according to claim 6, wherein the geographical area is covered by a heterogeneous communications network, and the first mobile device is in a radio resource control connected state;

wherein scheduling the first mobile device according to the channel status information of the first mobile device comprises determining, according to the predicted channel status information of the first mobile device when the first mobile device is located in the geographical area in which the second geographical sub-grid is located, whether to perform a handover for the first mobile device; and wherein the handover is specifically a network handover, a base station handover, or a cell handover.

9. The method according to claim 6, wherein the geographical area is covered by a homogeneous mobile communications network; and wherein scheduling the first mobile device according to the channel status information of the first mobile device comprises determining, according to the channel status information of the first mobile device, a communication service type of the first mobile device, and a fact that the geographical area in which the second geographical sub-grid is located is covered by a wireless local area network, whether to use the wireless local area network to offload service data transmitted by the first mobile device by using the mobile communications network.

10. The method according to claim 1, wherein the first mobile device is located in any geographical sub-grid, the any geographical sub-grid is covered by a heterogeneous mobile communications network, and the first mobile device switches from a radio resource control idle state to a radio resource control connected state; and wherein scheduling the first mobile device according to the channel status information of the first mobile device comprises determining, according to the channel status information of the first mobile device, access probabilities of accessing mobile communications networks in the heterogeneous mobile communications network by the first mobile device, and determining, according to the access probabilities, a mobile communications network accessed by the first mobile device.

11. A network device, comprising:
a processor; and
a non-transitory computer-readable storage medium storing a program to be executed by the processor, the program including instructions to:
predict, according to radio resource information stored in an information sub-grid of an information grid, channel status information of a first mobile device when the first mobile device is located in a geographical area in which any geographical sub-grid of a geographical grid is located, wherein there is a correspondence between an information sub-grid of the information grid and a geographical sub-grid of the geographical grid, and the information sub-grid is used to store radio resource information of a geographical area in which the corresponding geographical sub-grid is located; and
schedule the first mobile device according to the channel status information of the first mobile device.

12. The network device according to claim 11, wherein the program includes further instructions to, before the processor predicts, according to the radio resource information stored in the information sub-grid of the information grid, the channel status information of the first mobile device when the first mobile device is located in a geographical area in which any geographical sub-grid of the geographical grid is located, generate, according to the geographical grid obtained by dividing a geographical area covered by a mobile communications network, the information grid corresponding to the geographical grid; and the network device further comprises a receiver, wherein the receiver is configured to obtain radio resource information of a geographical area in which a geographical sub-grid of the geographical grid is located, and to store the radio resource information into an information sub-grid, of the information grid, corresponding to the geographical sub-grid of the geographical grid.

13. The network device according to claim 12, wherein the radio resource information comprises channel measurement information and/or mobile communications network information; and wherein the receiver is configured to obtain the channel measurement information reported by second mobile device in the geographical area in which the geographical sub-grid of the geographical grid is located, and/or obtain the mobile communications network information of the geographical area in which the geographical sub-grid of the geographical grid is located.

14. The network device according to claim 13, wherein the channel measurement information comprises at least one of the following: a channel quality indicator, first drive test information, or second drive test information; and wherein the receiver is further configured to:
obtain measurement report information reported by mobile device in a radio resource control connected state and in the geographical area in which the geographical sub-grid of the geographical grid is located;
obtain first drive test information reported by mobile device in an immediate minimization of drive tests state and in the geographical area in which the geographical sub-grid of the geographical grid is located; and/or
obtain second drive test information reported by mobile device in a logged minimization of drive tests state and in the geographical area in which the geographical sub-grid of the geographical grid is located.

15. The network device according to claim 13, wherein the mobile communications network information comprises network configuration information and/or network load information; and wherein the receiver is further specifically configured to obtain the network configuration information of the geographical area in which the geographical sub-grid of the geographical grid is located, and/or to obtain, according to a network load algorithm, the network load information of the geographical area in which the geographical sub-grid of the geographical grid is located.

16. The network device according to claim 11, wherein the program includes further instructions to:
determine a current geographical location of the first mobile device, and determine a first geographical sub-grid in which the current geographical location is located;

determine, according to a moving trend of the first mobile device, a second geographical sub-grid that the first mobile device is about to enter; and predict, according to a radio resource information stored in an information sub-grid corresponding to the second geographical sub-grid, channel status information of the first mobile device when the first mobile device is located in a geographical area in which the second geographical sub-grid is located.

17. The network device according to claim 16, wherein the geographical area is covered by a homogeneous mobile communications network, and the first mobile device is in a radio resource control connected state; and wherein the program includes further instructions to determine, according to the predicted channel status information of the first mobile device when the first mobile device is located in the geographical area in which the second geographical sub-grid is located, whether to heighten a scheduling priority of the first mobile device.

18. The network device according to claim 16, wherein the geographical area is covered by a heterogeneous communications network, and the first mobile device is in a radio resource control connected state;

wherein the program includes further instructions determine, according to the predicted channel status information of the first mobile device when the first mobile device is located in the geographical area in which the second geographical sub-grid is located, whether to perform a handover for the first mobile device; and wherein the handover is a network handover, a base station handover, or a cell handover.

19. The network device according to claim 16, wherein the geographical area is covered by a homogeneous mobile communications network, and wherein the program includes further instructions determine, according to the channel status information of the first mobile device, a communication service type of the first mobile device, and a fact that the geographical area in which the second geographical sub-grid is located is covered by a wireless local area network, whether to use the wireless local area network to offload service data transmitted by the first mobile device by using the mobile communications network.

20. The network device according to claim 11, wherein the first mobile device is located in any geographical sub-grid covered by a heterogeneous mobile communications network, and the first mobile device switches from a radio resource control idle state to a radio resource control connected state; and wherein the program includes further instructions determine, according to the channel status information of the first mobile device, access probabilities of accessing mobile communications networks in the heterogeneous mobile communications network by the first mobile device, and to determine, according to the access probabilities, a mobile communications network to be accessed by the first mobile device.

* * * * *